June 21, 1938.  E. VINCKE  2,121,062
MACHINE FOR CUTTING CONTINUOUS LENGTHS OF RUBBER THREADS
Filed Jan. 19, 1937  3 Sheets-Sheet 2
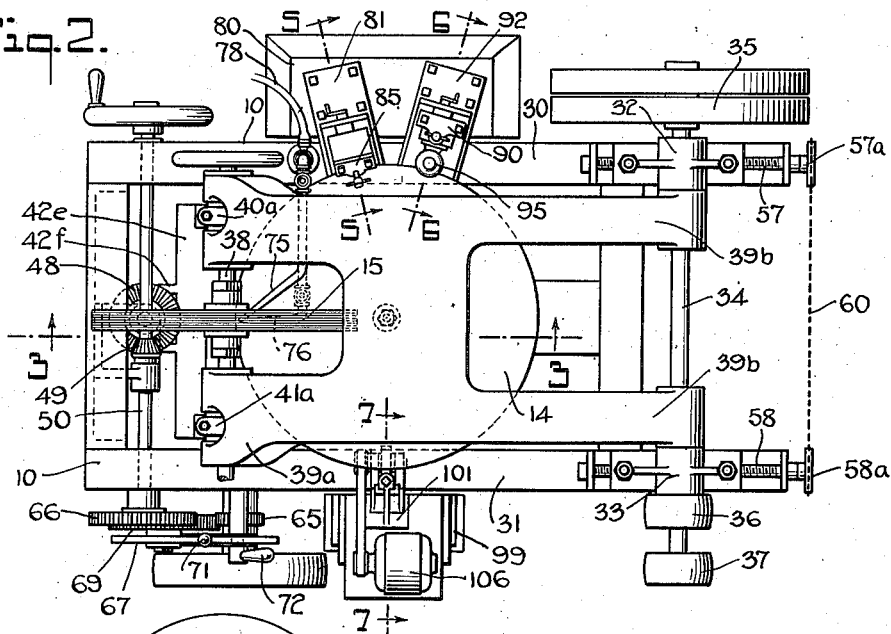
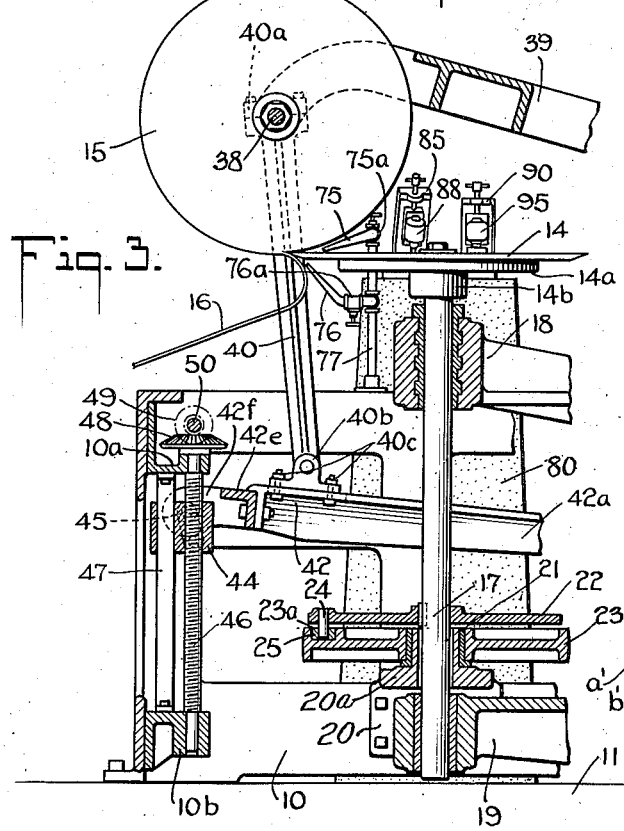
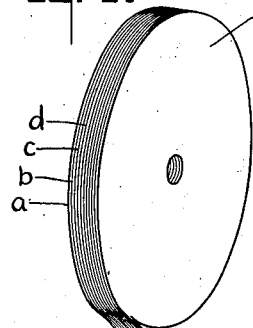
INVENTOR
Enrique Vincke
BY
Henry J. Lucke
HIS ATTORNEY June 21, 1938.  E. VINCKE  2,121,062
MACHINE FOR CUTTING CONTINUOUS LENGTHS OF RUBBER THREADS
Filed Jan. 19, 1937   3 Sheets-Sheet 3
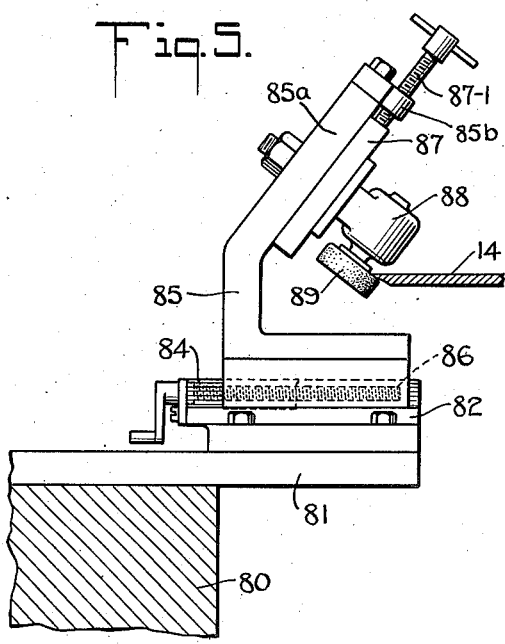
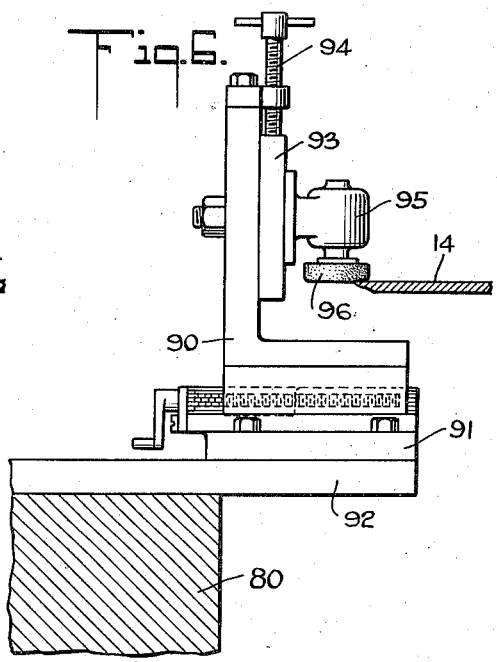
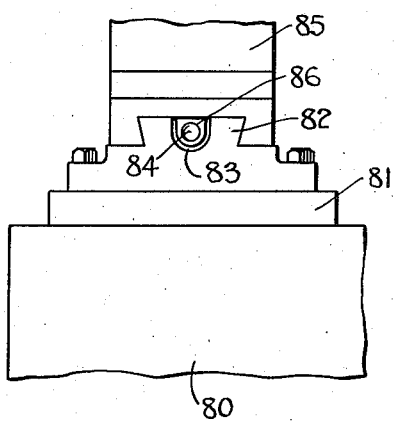
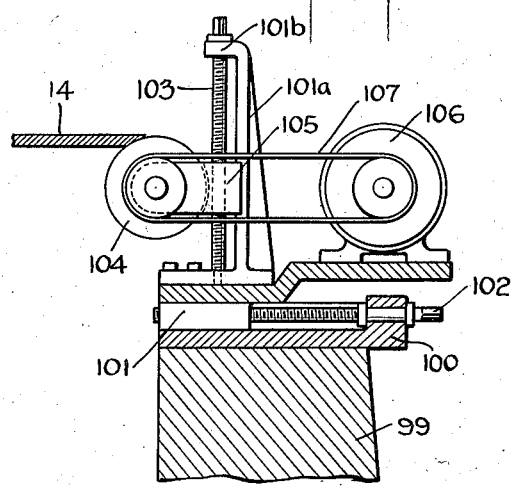
INVENTOR
Enrique Vincke
BY
HIS ATTORNEY Patented June 21, 1938

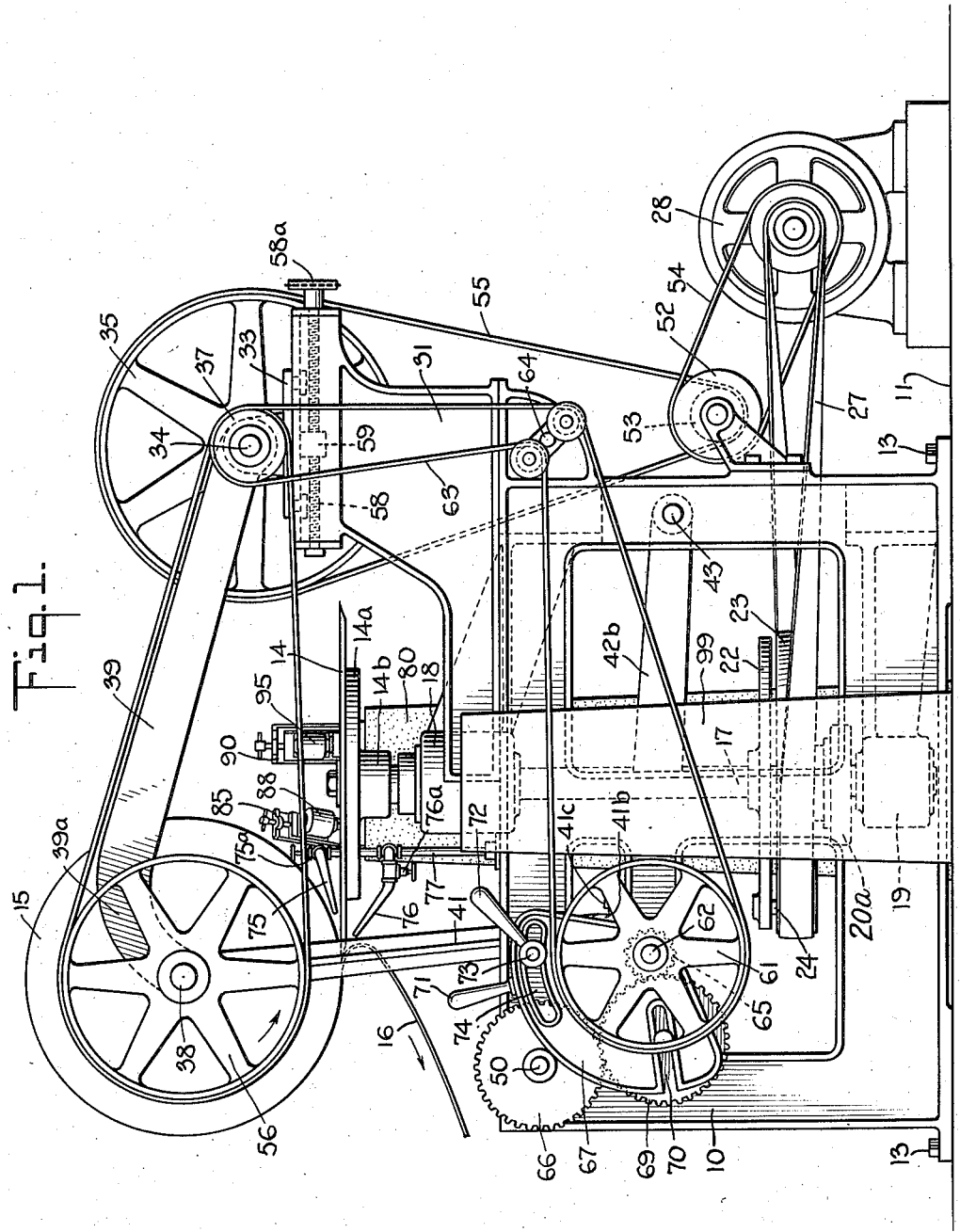

2,121,062

UNITED STATES PATENT OFFICE 2,121,062

MACHINE FOR CUTTING CONTINUOUS LENGTHS OF RUBBER THREADS

Enrique Vincke, Palamos, Spain, assignor to Harry H. Straus, New York, N. Y.

Application January 19, 1937, Serial No. 121,263

14 Claims. (Cl. 164—37)

This invention relates to machines for cutting continuous lengths of thread from a laminated block of rubber, or equivalent material.

The present application is a substitute for, and a continuation in part of, the application for U. S. patent, Serial No. 91,029, filed by me July 17, 1936.

For a variety of industrial and commercial uses it is desirable to produce from rubber, or its equivalent, threads of indefinite lengths and uniform transverse sectional area. My present invention affords the production of such threads from a laminated stock block of rubber, or equivalent material, continuously, attended by low production costs and optimum operating efficiency, inclusive of substantially complete utilization of the raw stock material. The dimensional characteristics of threads so produced may vary between relatively wide limits, but such threads generally have a polygonal transverse cross-section, and in many cases are of an extremely tenuous nature.

Pursuant to the invention, a composite block, preferably prepared from circular sheets or discs of rubber, or equivalent material, positioned non-displaceably relative to one another to provide a laminated structure for the composite block, is utilized as the raw stock. A continuous strip from such block, as a product of the present machine, is thus made up across its width of a definite number, corresponding to the number of laminae in the block, of threads having one dimension transverse to its length dependent upon the thickness of the individual laminae, and the other transverse dimension dependent upon the zone of cutting relative to the position of the composite block. Such threads, consequently, have the desirable quality of uniformity of thickness throughout their respective lengths.

Embodiments of the present invention include a circular knife mounted for rotation, a support for a preferably cylindrical block of rubber, or equivalent material, mounted for rotation at a predetermined speed relative to the speed of rotation of the circular knife, and means for feeding such block into the cutting plane of the knife approximately tangentially of the block and in such manner as to permit continuous withdrawal of the resulting strip of material in an undistorted form. Advantageously, such embodiments include means for adjusting the depth of bite of the knife into the circumferential surface of the block.

To make commercially practical the continuous cutting of a strip from the rubber block, it is highly desirable that sharpening means be provided as elements in the machine combination. The sharpening means preferably take the form of hone means and grinding means arranged for continuous operation proximate the cutting edge of the circular knife. Since the grinding and honing operations must be very carefully and precisely regulated, it is preferred that means for accomplishing same be mounted for support independently of the machine.

Further features and objects of the present invention will be more clearly understood from the following detail description and the accompanying drawings, in which:

Fig. 1 represents a side elevation of one preferred embodiment of the present invention, illustrated in the course of operation. Important hidden details are indicated by dotted line outlines.

Fig. 2 is a top plan view of the embodiment illustrated in Fig. 1. Portions in the background are omitted.

Fig. 3 is a fragmentary detail view taken on line 3—3 of Fig. 2. Sharpening means are illustrated as component elements of the machine.

Fig. 4 is a perspective view of a composite block of laminated rubber sheets used in the production of continuous lengths of uniformly dimensioned rubber threads.

Fig. 5 is an enlarged detail view, in side elevation, of a preferred form of hone as a component element of the machine combination.

Fig. 6 is an enlarged detail view in side elevation of a second type of hone as a component element of the machine.

Fig. 7 is an enlarged detail view in side elevation of a preferred type of grinding means as a component element of the machine. A portion of the view is illustrated in vertical section.

Fig. 8 is an enlarged fragmentary view in front elevation of the structure appearing in Fig. 5.

Referring to the drawings, at 10 is indicated a box-frame, preferably four-walled, and configurated to support, and maintain in operative relation to one another, the component mechanism of the present machine. Such main frame 10 is advantageously supported upon a concrete foundation 11, and may be rigidly secured thereto in any suitable manner, as for instance by the bolts 13.

The operative mechanism of the machine comprises in its essentials a circular knife, as at 14, rotatably mounted to cooperate in cutting relation with a block of material, as at 15, also rotatably mounted, means for rotating the two elements 14 and 15, and means for progressively feeding the one rotating element into the other, the cutting relationship between the two rotating elements 14 and 15 being approximately tangential, and the placement of the respective planes of rotation relative to one another being such that the resulting strip 16, cut continuously from the block of material, passes in undistorted form from the machine without interference thereby, as illustrated in Figs. 1 and 3.

The circular knife 14 is preferably mounted for rotation in a substantially horizontal plane, and, to insure stability of rotation, may include an integral body portion 14a, and a comparatively long hub 14b, extending therefrom. Such knife 14 is conveniently rigidly mounted at the upper end of a shaft 17 for rotation therewith, the shaft 17 having a vertical axis of rotation and being preferably journaled centrally of the box-frame 10. The block of material 15 is preferably mounted for rotation and progressive feeding relative to the zone of rotation of the knife 14, in substantially a vertical plane. The cutting plane of the knife 14 advantageously intersects the plane of the block 15 approximately tangentially thereof and near the lowermost portion of the circumferential surface of the block to secure optimum conditions for withdrawal of the resulting continuous strip 16.

The shaft 17, as illustrated in the preferred embodiment of the invention, is positively driven through vibration precluding instrumentalities as is illustrated in Fig. 3. The shaft 17 is rotatably mounted and aligned in the upper and lower bearing brackets 18 and 19, respectively extending inwardly from and rigidly secured to the box-frame 10. Rotative driving of the shaft 17 is accomplished by mounting a bushing 21 upon a hub 20a, formed in the bridge member 20 extending between the opposite side walls of the box-frame. 23 is the drive pulley, suitably connected, as by a belt 27, see Fig. 1, to the driving motor 28. The driving pulley 23 is connected with the face plate 22, the latter splined to the shaft 17, by a pin 24 depending from the under surface of the face plate 22, near the margin thereof, into yieldable packing material 25, contained by the cooperating receiving-recess 23a on the upper surface of the drive pulley 23.

Advantageously, the block of material 15 is rotated at a predetermined speed relative to the speed of rotation of the knife 14. Such related speeds of rotation are desirably afforded by the electric motor 28, through the medium of a train of mechanism as hereinafter described.

Rising above the box-frame 10, at an end of same, and secured, respectively, to opposite sides thereof are auxiliary side frames 30 and 31. Adjustably positioned in such side frames 30 and 31 are the journal boxes 32 and 33, respectively. A main drive shaft 34 is journaled intermediate its ends within the journal boxes 32 and 33, and has rigidly mounted at one end the main drive pulley 35, and at the other end the two intermediate drive pulleys 36 and 37.

At the end of the box-frame 10 opposite to that at which the main drive shaft 34 is journaled, are means for supporting and progressively feeding the block of material 15 relative to the circular knife 14. Such means advantageously includes a shaft 38 upon which is rigidly mounted for rotation therewith, the block of material 15. Such shaft 38 is journaled intermediate its ends in the arms 39a, 39a of one bifurcated end of a bridge-frame 39, the other end of the bridge-frame 39 being bifurcated and having its arms 39b, 39b mounted on the main drive shaft 34 for pivotal movement in a vertical plane. The arms 39a, 39a are, in turn, bifurcated at their bearing ends, see Fig. 2, to receive between such bifurcations, and in journaled relationship with the shaft 38, the bearing ends 40a and 41a, respectively, of the supporting legs 40 and 41. The opposite ends of such supporting legs 40 and 41 rest upon respective side members 42a and 42b of a floating frame 42, and include means such as the slidable feet 40b, 41b, respectively, for adjustable securement to the side members 42a and 42b, respectively, as by the sets of bolts 40c and 41c, respectively.

The side members 42a and 42b of such floating frame 42 are each pivoted at one end, see 43, Fig. 1, to the box-frame 10 for movement in a vertical plane, the other ends of same being connected by the cross-member 42e, and being therewith mutually linked to the floating block 44 by means of the forked member 42f cooperating with suitable links, as indicated in dotted lines at 45, for universal movement in a vertical plane. The floating block 44 is mounted in threaded relation with the jack-shaft 46, such shaft being journaled at its ends in the brackets 10a and 10b of the box-frame 10, and said block 44 is mounted in sliding relationship with the guide member 47, secured at its ends to the brackets 10a, and 10b, for progressive movement vertically. A miter gear 48, rigidly mounted at the upper end of the jack-shaft 46 and meshing with the miter gear 49, rigidly mounted on the shaft 50, serves to rotate the jack-shaft 46 at a speed, relative to the speed of rotation of the shaft 50, predetermined by the miter gear ratios.

Rotation of the block of material 15 at a desired speed relative to the speed of rotation of the circular knife 14, is accomplished by the motor 28.

The motor 28 transmits motion to the main drive pulley 35 through a series of intermediate pulleys 52 and 53, and the therewith coordinating belting 54 and 55. The drive pulley 35, mounted on the main drive shaft 34 transmits motion directly to the pulley 56, serving to rotate the shaft 38 and therewith the block of material 15 at a speed predetermined by the various pulley ratios.

Positioning of the block of material 15 relative to the circular knife 14 is accomplished by setting the slidable feet 40b and 41b of the legs 40 and 41 at suitable coordinated locations along the side members 42a and 42b, respectively, see Fig. 3. Adjustment with respect to the angle of attack of the block of material 15 relative to the zone of the circular knife 14 is accomplished by varying mutually the position of the journal boxes 32, 33, and therewith the main drive shaft 34, relative to the auxiliary side frames 30 and 31, respectively, such procedure effecting, through the bridge frame 39, the stated desired adjustment.

For affording such mutual variations of position, each of the journal boxes 32 and 33 are mounted in threaded relation with the screw shafts 57 and 58, respectively, as for instance by means of a female-threaded base block as indicated in dotted lines at 59, Fig. 1. Back-and-forth adjustment is effected manually by turning either one of the sprocket-hand wheels 57a and 58a, mutual turning being effected therewith through the medium of the endless chain connection 60.

Progressive feeding of the block of material 15 into the cutting zone of the knife 14 is preferably accomplished by indirect motivation from the motor 28. A pulley 61 rigidly mounted on the stub-shaft 62, which stub shaft is suitably journaled in the box-frame 10, is driven by the intermediate drive pulley 37 through the medium of the belt 63 preferably passing over guide sheaves as indicated generally at 64. A pinion 65 is also rigidly and removably mounted on the stub-shaft 62.

Rigidly and removably mounted on the end of the shaft 50 adjacent pulley 61, is a gear 66, and removably and rotatably mounted, as in the control plate 67, for mutual meshing with the pinion 65 and the gear 66 is an intermediate gear 69. The diameter of the pinion 65 relative to the diameter of the gear 66 determines the rate of speed at which the block of material 15 moves into the cutting plane of the knife 14 and therefore is a primary factor in determining the thickness of the resulting strip of material 16. The intermediate gear 69, for convenient removal and replacement by a gear of a different diameter or additional intermediate gearing, may have its shaft rotatably disposed and secured within an open slot 70 of the control plate 67, and is preferably disposed for continuous meshing engagement with the pinion 65, and thus for continuous rotation by same, during operation of the machine. The control plate 67 is preferably pivotally mounted on the stub-shaft 62 for movement in a vertical plane to permit meshing and non-meshing disposition of the intermediate gear 69 with respect to the gear 66. Advantageously, such pivotal movement vertically is effected manually by means of the handle 71, the control plate being locked in the desired meshing or non-meshing position by means of the handle-lock 72 movably mounted on, and in screw relation with, the threaded stud 73. Such stud 73 extends from the box-frame 10 into a slot 74 suitably disposed for the reception of same in the control plate 67.

Rotation of the shaft 50 by the just described series of pulleys and gears effects rotation of the vertical jack-shaft 46 and a consequent progressive lowering of the frame 42, and therewith a progressive lowering of the block of material 15 into the cutting zone of the knife 14 to accomplish a continuous progressive feeding thereof. The resulting continuous strip of material 16 passes from the machine in an undistorted form without interference by component parts of the stated machine, see Figs. 1 and 3. Such strip 16 may pass to suitable reels (not shown) for further treatment.

The thickness of the strip of material 16 may be determined to a micrometric nicety, i. e. within a fraction of one-thousandth of an inch, by varying mutually the locations of the supporting legs 40 and 41 along the length of the side members 42a and 42b, respectively.

During the cutting operation, water or other suitable lubricating liquid is applied directly to the cutting zone. Preferably such application is accomplished by sprays, and, advantageously, such sprays are directed into the cutting zone simultaneously on both sides thereof. A combination of nozzles for effecting such sprays is illustrated in Fig. 1, an upper nozzle being indicated at 75 and a lower nozzle at 76. The two nozzles 75 and 76 are supported in proper positions, respectively, relative to the cutting zone of the knife by a pipe-standard 77, such pipe-standard being supplied, and in turn supplying the respective nozzles, with water or other suitable lubricating liquid from a supply line 78, see Fig. 2. The control valves 75a and 76a of the respective nozzles 75 and 76 may be adjusted manually to determine the rate of supply of such lubricating liquid to the cutting zone of the knife.

To afford maintained efficiency of cutting during the production of a continuous strip from the rubber block 15, sharpening means are provided, effective proximate the cutting edge of the circular knife, for preferably continuous independent operation as component elements of the machine combination.

Such sharpening means advantageously comprise two hone assemblies, illustrated in detail in Figs. 5, 6, and 8, for continuous operation during the cutting action of the circular knife 14; and a grinding assembly, see Fig. 7, also arranged preferably for continuous operation during such cutting action.

The hone assemblies being operative upon the cutting edge of the circular knife 14 continuously, must necessarily be carefully and precisely placed and maintained with respect thereto. Accordingly, it is preferred to provide supporting means for the hone assemblies independent of the machine proper, as for instance, the concrete foundation pier 80, Fig. 3. The two hone assemblies are of mutually different types, i. e. one being operative on the lower blade surface, and the other being operative on the upper blade surface of the circular knife.

A preferred type of hone assembly for operation on the under blade surface is illustrated in Fig. 5. It comprises in part a base plate 81, suitably secured to the top of the foundation pier 80, and a slideway bed 82 having a recess 83 extending centrally lengthwise thereof. The ends of the recess 83 are closed, and a screw shaft 84 is journaled therein to extend lengthwise of the recess. Slidably mounted on the slideway bed 82, is a supporting frame 85 having a centrally disposed, female threaded rib 86 depending into the recess 83, and serving, by reason of threaded engagement with the shaft 84, to afford manual back-and-forth adjustment for the supporting frame 85. The supporting frame 85 includes a portion 85a disposed at a proper angle respective to the circular knife 14, and adapted to receive in sliding relation therewith a base element 87. Rigidly secured to such base element 87 is a small electric motor 88 having a suitably formed and configurated hone wheel 89 removably mounted on shaft extension thereof, for cooperation with the lower blade surface of the circular knife 14. The hone wheel 89 is actuated independently of the knife preferably by means of the individual electric motor 88. Adjustment of position of the hone wheel relative to the blade surface is afforded by the set screw 87—1 threadedly carried by a boss member 85b and rigidly connected to the base element 87. The hone wheel 89 rotates independently of the rotation of the circular knife 14.

A preferred type of hone assembly operative upon the upper blade surface of the circular knife 14 is illustrated in Fig. 6, and comprises a supporting frame 90, slidably mounted, in the same manner as described in reference to Fig. 5, on the slideway bed 91 which is in turn secured to the base plate 92 attached to the top of the independent foundation pier 80. Slidably mounted in the supporting frame 90 in a suitable manner, as illustrated, is a base element 93 adapted for up and down adjustability, relative to the knife 14, by means of the set screw 94. Rigidly secured to the base element 93, for up and down movement therewith, is a small electric motor 95 disposed with its drive shaft extension proximate the knife 14. A hone wheel 96, rigidly and removably mounted on the shaft extension of the motor 94, is disposed in operative alignment with the upper blade surface of the circular knife 14, as illustrated. The hone wheel 96 rotates independently of the rotation of the circular knife.

The respective hone assemblies, with their hone wheels disposed in suitable sharpening relationship to the respective lower and upper blade surfaces, cooperate to effect adequate continuous honing of the knife 14 during its cutting operation.

The grinding assembly, see Figs. 2 and 7, is preferably also mounted on an independent foundation pier, as at 99, a bed plate 100 being interposed therebetween. A supporting frame 101 is adjustably secured to the bed plate 100 by means of the screw shaft 102 engaging both members. The frame 101 includes a standard 101a having at its top an extending ear 101b serving to rotatably receive and support the upper unthreaded end of the vertical screw shaft 103, extending from the base of the standard 101a.

A grinding wheel 104 is rotatably mounted on a movable bracket element 105 threadedly carried by the screw shaft 103 for adjustability in vertical directions. Rotation of the grinding wheel 104 may be accomplished through an independent electrical motor 106, mounted on the frame 101 and effecting rotation of the grinding wheel 104 by means of a belt 107.

By proper adjustment of the screw connections 102 and 103, the grinding wheel 104 may be brought into contact with the lower blade surface of the circular knife 14 to effect grinding thereof. When desired, the bracket element 105 and therewith the grinding wheel 104 may be elevated to the upper portion of the screw shaft 103 for grinding of the upper blade surface of the knife. The grinding is preferably carried on continuously during the cutting operation of the machine.

It will be noted that continuous cutting of the rubber block 15, continuous honing of the respective blade surfaces and continuous grinding of the proper blade surface, of the circular knife 14, in the above described preferred forms of the invention, is accomplished simultaneously under proper conditions of lubrication, supplied from common sources, for all three operations.

The highly favorable conditions under which the present machine as a whole is able to operate in the cutting of a continuous strip from a laminated block of rubber, or equivalent material, are produced by the interaction of the described component elements of the machine in precise relationship. The product resulting from operation of the machine reflects to a high degree the importance, from a practical commercial standpoint, of this relationship and of the combined action of the various described component elements.

The present machine is designed especially for the production of continuous lengths of tenuous threads of rubber, such threads having the quality of uniformity of cross-sectional dimensions throughout their lengths. Pursuant to such use, the block of material 15, see Fig. 4, comprises preferably circular laminae, as indicated at a, b, c, d, of a sheet rubber, or equivalent material, the individual laminae being preferably bound to one another by an adhesive. The continuous strip 16 cut therefrom by the present machine, may be subsequently treated in a suitable manner, as by passing through a bath solvent to dissolve the adhesive and separate the individual threads indicated at a', b', c', d', from one another.

If desired, the individual circular sheets or discs comprising the laminae of the composite block may be held in non-displaceable relation to each other without the use of an adhesive, such non-displaceable relation being accomplished by any suitable means such as discs of fiber-board or like material, as is set forth and illustrated in my U. S. Letters Patent No. 2,064,508, entitled Process and device for producing threads of India rubber, granted December 15, 1936, forming the outer side laminae and functioning to confine the rubber, or its equivalent, circular sheets or discs therebetween. The continuous strip cut from the composite block so produced will divide automatically into component continuous lengths of thread upon passing from the machine.

Whereas, I have described my invention by reference to specific forms thereof, it will be understood that many changes and modifications may be made without departing from the spirit of the invention, as set forth in the claims following this specification.

I claim:

1. In a cutting machine, a main frame structure, a circular knife rotatably mounted in said structure, means for rotatably mounting a block of cuttable material in said frame structure so that a peripheral surface of said block is located adjacent to and approximately tangentially of the cutting zone of said circular knife, means effecting rotation of said circular knife and said block at predetermined relative speeds, a floating frame pivoted to said main frame structure for movement in a vertical plane, said floating frame adjustably carrying said block mounting means, and means for progressively moving said floating frame during the rotation of said circular knife and of the said block, such means being actuated in coordination with the speeds of rotation of said circular knife and said block, and the direction of movement being such as to progressively feed said block of material into the cutting zone of said circular knife.

2. In a cutting machine, a main frame structure, a circular knife mounted in said frame structure for rotation in approximately a horizontal plane, a main drive shaft rotatably mounted in said frame structure, the position of said shaft being adjustable horizontally relative to such frame structure, means for mounting a block of cuttable material for rotation in approximately a vertical plane, the zone of rotation of said block being adjacent approximately tangentially to the cutting zone of said circular knife, a rigid frame pivotally connecting said main drive shaft and such block mounting means, a floating frame pivoted at one of its ends to said main frame structure and connected in threaded relation at an opposite end to a jack-shaft, means carried by said floating frame for adjustably engaging said block mounting means, and means for simultaneously rotating said circular knife, said block of material, and said jack-shaft, the rotation of said jack-shaft effecting movement of said floating frame operative to progressively feed said block of material approximately tangentially into the cutting zone of said circular knife.

3. In a cutting machine, a main frame structure, a circular knife rotatably mounted in said structure, means for rotatably mounting a block of cuttable material in said frame structure so that a peripheral surface of said block is located adjacent to and approximately tangentially of the cutting zone of said circular knife, means effecting rotation of said circular knife and said block at predetermined relative speeds, a floating frame pivoted to said main frame structure for movement in a vertical plane, said floating frame adjustably carrying said block mounting means, and means for progressively moving said floating frame during the rotation of said circular knife and of the said block, such means being actuated in coordination with the speeds of rotation of said circular knife and said block, and the direction of movement being such as to progressively feed said block of material into the cutting zone of said circular knife.

4. In a cutting machine, a main frame structure, a circular knife mounted in said frame structure for rotation in approximately a horizontal plane, a main drive shaft rotatably mounted in said frame structure, the position of said shaft being adjustable horizontally relative to such frame structure, means for mounting a block of cuttable material for rotation in approximately a vertical plane, the zone of rotation of said block being adjacent approximately tangentially to the cutting zone of said circular knife, a rigid frame pivotally connecting said main drive shaft and said block mounting means, a floating frame pivoted at one of its ends to said main frame structure and connected in threaded relation at an opposite end to a jack-shaft, means carried by said floating frame for adjustably engaging said block mounting means, and means for simultaneously rotating said circular knife, said block of material, and said jack-shaft, the rotation of said jack-shaft effecting movement of said floating frame operative to progressively feed said block of material approximately tangentially into the cutting zone of said circular knife.

5. In a cutting machine, a main frame structure, a circular knife rotatably mounted in said frame structure, means for rotatably mounting a block of cuttable material adjacent approximately tangentially the cutting zone of said circular knife, means for effecting simultaneous rotation of said circular knife and said block, means synchronized at a reduced speed with the said rotation-effecting-means for progressively feeding said block into the cutting zone of said circular knife, and means for determining the rate of progressive feeding of the said block with respect to the relative speeds of rotation of the said block and the said circular knife, said last mentioned means being removable for substituting other means to change the rate of said progressive feeding.

6. In a cutting machine, a main frame structure, a circular knife rotatably mounted in said frame structure, means for rotatably mounting a circular block of cuttable material in said frame structure so that the circumferential surface of said block is located adjacent to and approximately tangentially of the cutting zone of said circular knife, means effecting rotation of said circular knife and said block at predetermined relative speeds, means for adjusting the angle of attack of said circular block with respect to the cutting zone of said knife, means for effecting a micrometric adjustment of the depth of bite of said circular block, and means for progressively feeding said circular block into the cutting zone of said circular knife.

7. In a machine for producing continuous lengths of rubber thread from a laminated block of rubber comprising laminations of circular discs of rubber held in non-displaceable relationship to one another, a main frame structure, a circular knife rotatably mounted in said frame structure for rotation in approximately a horizontal plane, a main drive shaft rotatably mounted in said frame structure, the positioning of said shaft being adjustable horizontally relative to such frame structure, means for mounting the laminated block of rubber for rotation in approximately a vertical plane, the zone of rotation of said block being adjacent approximately tangentially to the cutting zone of said circular knife, a rigid frame pivotally connecting said main drive shaft and said block mounting means, a floating frame pivoted at one of its ends to said main frame structure and connected in threaded relation at an opposite end to a jack-shaft, means carried by said floating frame for adjustably engaging said block mounting means, said first mentioned means comprising an arrangement for effecting micrometric determination of the thickness of the continuous strip cut from said laminated block of rubber, and means for simultaneously rotating said circular knife, said laminated block of rubber and said jack-shaft, the rotation of said jack-shaft effecting movement of said floating frame to progressively feed said laminated block of rubber approximately tangentially into the cutting zone of said circular knife.

8. In a machine for cutting rubber, a circular knife mounted for rotation, means for mounting a block of rubber for rotation at a predetermined speed relative to the speed of rotation of the circular knife, means for rotating said circular knife and said block of rubber, and means for feeding said block of rubber into the cutting zone of the knife approximately tangentially of the block and in a manner to allow continuous withdrawal of the resulting strip of rubber in an undistorted form, sharpening means operative on the blade of said circular knife during its cutting action, and means for supplying lubricant for the cutting and the sharpening operations.

9. In a machine for cutting rubber, a circular knife mounted for rotation, means for mounting a block of rubber for rotation at a predetermined speed relative to the speed of rotation of the circular knife, means for rotating said circular knife and said block of rubber, and means for feeding said block of rubber into the cutting zone of the knife approximately tangentially of the block and in a manner to allow continuous withdrawal of the resulting strip of rubber in an undistorted form, sharpening means operative on the blade of said circular knife during its cutting action, said sharpening means comprising a hone assembly operative continuously on one blade surface of the circular knife, a second hone assembly operative continuously on the opposite blade surface of the circular knife, and a grinder assembly operative on one blade surface of the circular knife during the cutting operation thereof, and means for supplying lubricant for the cutting and the sharpening operations.

10. In a machine for producing rubber threads, a circular knife mounted for rotation, means for mounting a circular block of rubber for rotation at a predetermined speed relative to the speed of rotation of the circular knife, means for rotating said circular knife and said block of rubber.

and means for feeding said block of rubber into the cutting zone of the knife approximately tangentially of the block, the block and said knife being so located with respect to each other that a plane passed through said block perpendicularly to its axis of rotation will pass through or closely adjacent the axis of rotation of said knife.

11. In a machine for producing rubber threads, a circular knife mounted for rotation, means for mounting a circular composite block of rubber comprising disc laminations for rotation at a predetermined speed relative to the speed of rotation of the circular knife, means for rotating said circular knife and said composite block of rubber comprising disc laminations, and means for feeding said block of rubber into the cutting zone of the knife approximately tangentially of the block, the block and said knife being so located with respect to each other that a plane passed through said block perpendicularly to its axis of rotation will pass through or closely adjacent the axis of rotation of said knife.

12. In a machine for producing rubber threads, a circular knife mounted for rotation in approximately a horizontal plane, means for mounting a circular block of rubber for rotation in approximately a vertical plane at a predetermined speed relative to the speed of rotation of the circular knife, means for rotating said circular knife and said block of rubber, and means for feeding said block of rubber into the cutting zone of the knife approximately tangentially of the block, the block and said knife being so located with respect to each other that a plane passed through said block perpendicularly to its axis of rotation will pass through or closely adjacent the axis of rotation of said knife.

13. In a machine for cutting rubber, or its equivalent, a circular knife mounted for rotation, means for mounting a block of rubber or equivalent material for rotation at a predetermined speed relative to the speed of rotation of the circular knife, means for rotating said circular knife and said block, and means for feeding said block into the cutting zone of the knife approximately tangentially of the block and in a manner to allow continuous withdrawal of the resulting strip of rubber in an undistorted form, sharpening means operative on the blade of said circular knife during its cutting action, said sharpening means being mounted independently of the machine, and means for supplying lubricant for the cutting and the sharpening operations.

14. In a machine for cutting rubber, or its equivalent, a circular knife mounted for rotation, means for mounting a block of rubber or equivalent material for rotation at a predetermined speed relative to the speed of rotation of the circular knife, means for rotating said circular knife and said block, and means for feeding said block into the cutting zone of the knife approximately tangentially of the block and in a manner to allow continuous withdrawal of the resulting strip of rubber in an undistorted form, sharpening means operative on the blade of said circular knife during its cutting action, said sharpening means comprising a hone assembly operative continuously on one blade surface of the circular knife, a second hone assembly operative continuously on the opposite blade surface of the circular knife, and a grinder assembly operative continuously on a blade surface of the circular knife during the cutting operation thereof, said hone assemblies being mounted independently of the machine and of the grinding means, and means for supplying lubricant for the cutting and the sharpening operations.

ENRIQUE VINCKE.